(12) United States Patent
Liang

(10) Patent No.: US 7,706,067 B2
(45) Date of Patent: Apr. 27, 2010

(54) DECELERATING AND LOCKING MECHANISM FOR A PROJECTION SCREEN AND THE MANUALLY OPERATED PROJECTION SCREEN USING THE MECHANISM

(75) Inventor: Chaotong Liang, Guangzhou (CN)

(73) Assignee: Guangzhou Grandview Crystal Screen Co., Ltd., Guangdong (CN)

( * ) Notice: Subject to any disclaimer, the term of this patent is extended or adjusted under 35 U.S.C. 154(b) by 881 days.

(21) Appl. No.: 11/499,567

(22) Filed: Aug. 4, 2006

(65) Prior Publication Data

US 2007/0035828 A1    Feb. 15, 2007

(30) Foreign Application Priority Data

Aug. 12, 2005  (CN) .................... 2005 2 0063196 U
Nov. 1, 2005   (CN) ...................... 2005 1 0100943
Nov. 1, 2005   (CN) .................... 2005 2 0066818 U

(51) Int. Cl.
*G03B 21/56* (2006.01)

(52) U.S. Cl. ..................................................... 359/461

(58) Field of Classification Search ................ 359/461; 160/8, 24, 291, 296, 300–301, 305

See application file for complete search history.

(56) References Cited

U.S. PATENT DOCUMENTS

| | | | | | |
|---|---|---|---|---|---|
| 2,946,377 | A | * | 7/1960 | Zoll et al. | 160/8 |
| 3,251,264 | A | * | 5/1966 | Jacobson | 359/461 |
| 3,349,876 | A | * | 10/1967 | Sheckells | 188/185 |
| 4,513,805 | A | * | 4/1985 | Mase | 160/299 |
| 4,674,550 | A | * | 6/1987 | Graves | 160/326 |
| 4,838,333 | A | * | 6/1989 | Mottura | 160/305 |
| 7,451,799 | B2 | * | 11/2008 | Sanchez | 160/133 |

* cited by examiner

*Primary Examiner*—Christopher Mahoney
(74) *Attorney, Agent, or Firm*—Frommer Lawrence & Haug LLP; Ronald R. Santucci

(57) ABSTRACT

The present invention provides a manually operated projection screen having a decelerating and locking mechanism which intergrates a decelerating mechanism and a locking mechanism as a whole. The decelerating and locking mechanism for a projection screen includes a braking and locking device having a centrifugal brake shoe, a brake drum interacting with the centrifugal brake shoe to perform decelerating function, and a ratchet interacting with the centrifugal brake shoe to perform locking function. The decelerating and locking mechanism includes at least three sets of planetary gear, the transmission ratio of the planetary gear is 1:32 or above. The decelerating and locking mechanism and the projection screen using the same is compact and easy to assemble. The projection screen can be freely positioned or locked at any moment and is free of crease.

24 Claims, 3 Drawing Sheets

DECELERATING AND LOCKING MECHANISM FOR A PROJECTION SCREEN AND THE MANUALLY OPERATED PROJECTION SCREEN USING THE MECHANISM

This application claims priority benefits from Chinese Utility Model Application No. 200520063196.5 filed Aug. 12, 2005 and Chinese Utility Model Application No. 200520066818.X filed Nov. 1, 2005 and Chinese Patent Application No. 200510100943.2 filed Nov. 1, 2005.

TECHNICAL FIELD

The present invention relates to the field of projection screens, and particularly relates to the decelerating and locking mechanism for a projection screen and the manually operated projection screen using the same.

BACKGROUND OF THE INVENTION

The existing manually operated projection screen consists of a pulling tube, a curtain, a torsion spring assembly, a locking mechanism, a rotating tube and a housing, wherein one end of the curtain is connected to the pulling tube and the other end of the curtain is connected to the rotating tube. In use, the curtain is unrolled and locked by pulling the pulling tube at one end of the curtain by hand. When the curtain is no longer in use, the locking mechanism is released, and the curtain is rolled back by the rotating tube driven by the torsion spring assembly so as to return from the unrolled state in use to the state of being rolled back around the rotating tube. A decelerating mechanism is arranged in the rotating tube so that the curtain can be smoothly rolled back. A locking mechanism (i.e. positioning mechanism) is provided so that the curtain can be freely locked in position at any moment.

The existing decelerating mechanism and locking mechanism have the following disadvantages:

1) Arranging the decelerating mechanism and the locking mechanism in the rotating tube makes the structure complex, and makes the assembling inconvenient, thus resulting in high cost;
2) The existing decelerating mechanism for a projection screen has lower transmission ratio. Therefore, when the curtain is rolled back, the speed of the curtain is too fast and thus the pulling tube and the housing collide violently, which may damage the pulling tube and the housing;
3) During the rolling back and the pulling down of the curtain, it is necessary to lock or position the curtain frequently. The existing locking mechanism can lock or position the curtain twice during one cycle of the rotating tube. Assuming the diameter of the rotating tube is 43 mm, the curtain can be locked once when the curtain has moved a distance of 43π/2=67.5 mm. Since the rotating tube can continue rotating a little after being locked, the locking mechanism can not be in a completely locking state after the curtain is completely rolled back. Thus the torsion force of the torsion spring still acts on the rotating tube and is further transferred to the curtain. As a result, the curtain is under a great pulling force for a long time.

In addition, since the rotating tube can continue rotating a little after being locked, the curtain cannot be rolled around the rotating tube smoothly and stretchedly. In other words, the curtain may be folded partially, thereby some crease or wrinkle may be formed on the curtain because the curtain is under pressure for a long time. Thus, the crease would affect the usability of the projection screen for the next time.

SUMMARY OF THE INVENTION

The object of the present invention is to overcome the disadvantages in the art and provide a creaseless manually operated projection screen which intergrates a decelerating mechanism and a locking mechanism as a whole and is compact and easy to assemble.

Another object of the present invention is to provide a creaseless manually operated projection screen having a decelerating mechanism with high transmission ratio, so that the rolling back speed of the curtain is sufficiently damped.

Still another object of the present invention is to overcome the disadvantages in the art and to provide a creaseless manually operated projection screen having a locking mechanism with smaller stepping, which is capable of locking or positioning the curtain more times without further rotating or moving after the curtain is locked or positioned. Therefore, the force of the torsion spring acting on the curtain is decreased when the curtain has been rolled back completely, and thereby no crease is formed on the curtain.

The invention provides a manually operated projection screen including a pulling tube, a curtain, a decelerating and locking mechanism, a torsion spring assembly, rotating tube, and a housing. The pulling tube is connected to one end of the curtain while the rotating tube is connected to the other end of the curtain. The decelerating and locking mechanism is arranged in the rotating tube and is formed by integrating a decelerating mechanism and a locking mechanism as a whole.

The invention further provides a manually operated projection screen including a pulling tube, a curtain, a decelerating and locking mechanism, a torsion spring assembly, a rotating tube, and a housing. The pulling tube is connected to one end of the curtain while the rotating tube is connected to the other end of the curtain. The decelerating and locking mechanism is arranged in the rotating tube and includes a braking and locking device having a centrifugal brake shoe, a brake drum interacting with the centrifugal brake shoe to perform decelerating function, and a ratchet interacting with the centrifugal brake shoe to perform locking function.

The invention further provides a manually operated projection screen including a pulling tube, a curtain, a decelerating and locking mechanism, a torsion spring assembly, a rotating tube, and a housing. The pulling tube is connected to one end of the curtain while the rotating tube is connected to the other end of the curtain. The decelerating and locking mechanism. is arranged in the rotating tube and includes at least three sets of planetary gear.

The invention further provides a manually operated projection screen including a pulling tube, a curtain, a decelerating and locking mechanism, a torsion spring assembly, a rotating tube, and a housing. The pulling tube is connected to one end of the curtain while the rotating tube is connected to the other end of the curtain. The decelerating and locking mechanism is arranged in the rotating tube and includes a transmission case, a transmission case head, a shaft, a seal ring, a self-locking spring spindle, a self-locking spring, a planetary gear, a planetary gear fixing carrier, a centrifugal brake shoe, and a ratchet. The transmission case head covers the transmission case; the seal ring is pressed and mounted on the shaft; the self-locking spring spindle is mounted on the shaft; the self-locking spring surrounds the self-locking spring spindle; the planetary gear fixing carrier is mounted outside the self-locking spring; one end of the self-locking spring is fixed to the planetary gear fixing carrier; the planetary gear is mounted on the planetary gear fixing carrier and engages with the internal teeth of the transmission case; the centrifugal brake shoe is arranged on a brake shoe carrier; the planetary gear drives the brake shoe carrier to rotate; and the ratchet is arranged on the shaft. The centrifugal brake shoe interacts with a brake drum. to perform the decelerating function, and interacts with the ratchet to perform the locking function.

The invention further provides a manually operated projection screen including a pulling tube, a curtain, a decelerating and locking mechanism, a torsion spring assembly, a rotating tube, and a housing. The pulling tube is connected to one end of the curtain while the rotating tube is connected to the other end of the curtain. The decelerating and locking mechanism is arranged in the rotating tube and includes a transmission case, a transmission case head, a shaft, a seal ring, a self-locking spring spindle, a self-locking spring, a planetary gear, a planetary gear fixing carrier, a centrifugal brake shoe, and a ratchet. The transmission case head covers the transmission case; the seal ring is pressed and mounted on the shaft; the self-locking spring spindle is mounted on the shaft; the self-locking spring surrounds the self-locking spring spindle; the planetary gear fixing carrier is mounted outside the self-locking spring; one end of the self-locking spring is fixed to the planetary gear fixing carrier; the planetary gear is mounted on the planetary gear fixing carrier and engages with the internal teeth of the transmission case; the centrifugal brake shoe is arranged on a brake shoe carrier; the planetary gear drives the brake shoe carrier to rotate; and the ratchet is arranged on the shaft. There are at least three sets of planetary gear.

The invention also provides a decelerating and locking mechanism for a projection screen such that the decelerating and locking mechanism is formed by integrating a decelerating mechanism and a locking mechanism as a whole. The decelerating and locking mechanism includes a braking and locking device having a centrifugal brake shoe, a brake drum interacting with the centrifugal brake shoe to perform decelerating function, and a ratchet interacting with the centrifugal brake shoe to perform locking function.

The invention also further provides a decelerating and locking mechanism for a projection screen including a transmission case, a transmission case head, a shaft, a seal ring, a self-locking spring spindle, a self-locking spring, a planetary gear, a planetary gear fixing carrier, a centrifugal brake shoe, and a ratchet. The transmission case head covers the transmission case; the seal ring is pressed and mounted on the shaft; the self-locking spring spindle is mounted on the shaft; the self-locking spring surrounds the self-locking spring spindle; the planetary gear fixing carrier is mounted outside the self-locking spring; one end of the self- locking spring is fixed to the planetary gear fixing carrier; the planetary gear is mounted on the planetary gear fixing carrier and engages with the internal teeth of the transmission case; the centrifugal brake shoe is arranged on a brake shoe carrier; the planetary gear drives the brake shoe carrier to rotate; and the ratchet is arranged on the shaft. The centrifugal brake shoe interacts with a brake drum to perform a decelerating function and interacts with the ratchet to perform a locking function.

The decelerating and locking mechanism may include a braking and locking device. The braking and locking device includes a centrifugal brake shoe, a brake drum interacting with the centrifugal brake shoe to perform the decelerating function, and ratchet interacting with the centrifugal brake shoe to perform the locking function.

The decelerating and locking mechanism may include at least three sets of planetary gear. The transmission ratio of the planetary gear is 1:32 or above. Preferably, the transmission ratio of the planetary gear is 1:64.

A stop boss is formed on the surface of the centrifugal brake shoe to engage with the ratchet for the locking function. It is possible that at least two bosses are formed on the surface of the centrifugal brake shoe and spaced with each other. The inner surface of the transmission case may serve as the brake drum to cooperate with the brake shoe for the decelerating function.

The ratchet has 6 or more teeth, preferably 10 teeth. The ratchet may be stationary relative to the stop boss formed on the surface of the centrifugal brake shoe.

The number of the centrifugal brake shoe may be 2 or more, centrifugal shafts are symmetrically formed on the brake shoe carrier, and the centrifugal brake shoes are arranged on the centrifugal shafts, respectively.

An arcuate groove is provided in the planetary gear fixing carrier and one end of the self-locking spring is connected to the planetary gear fixing carrier by the arcuate groove.

A fluid inflow port may be provided on the transmission case so as to cool the members in the transmission case.

BRIEF DESCRIPTION OF THE DRAWINGS

An embodiment of the invention will be described by reference to the drawings in which.

Figure 1:
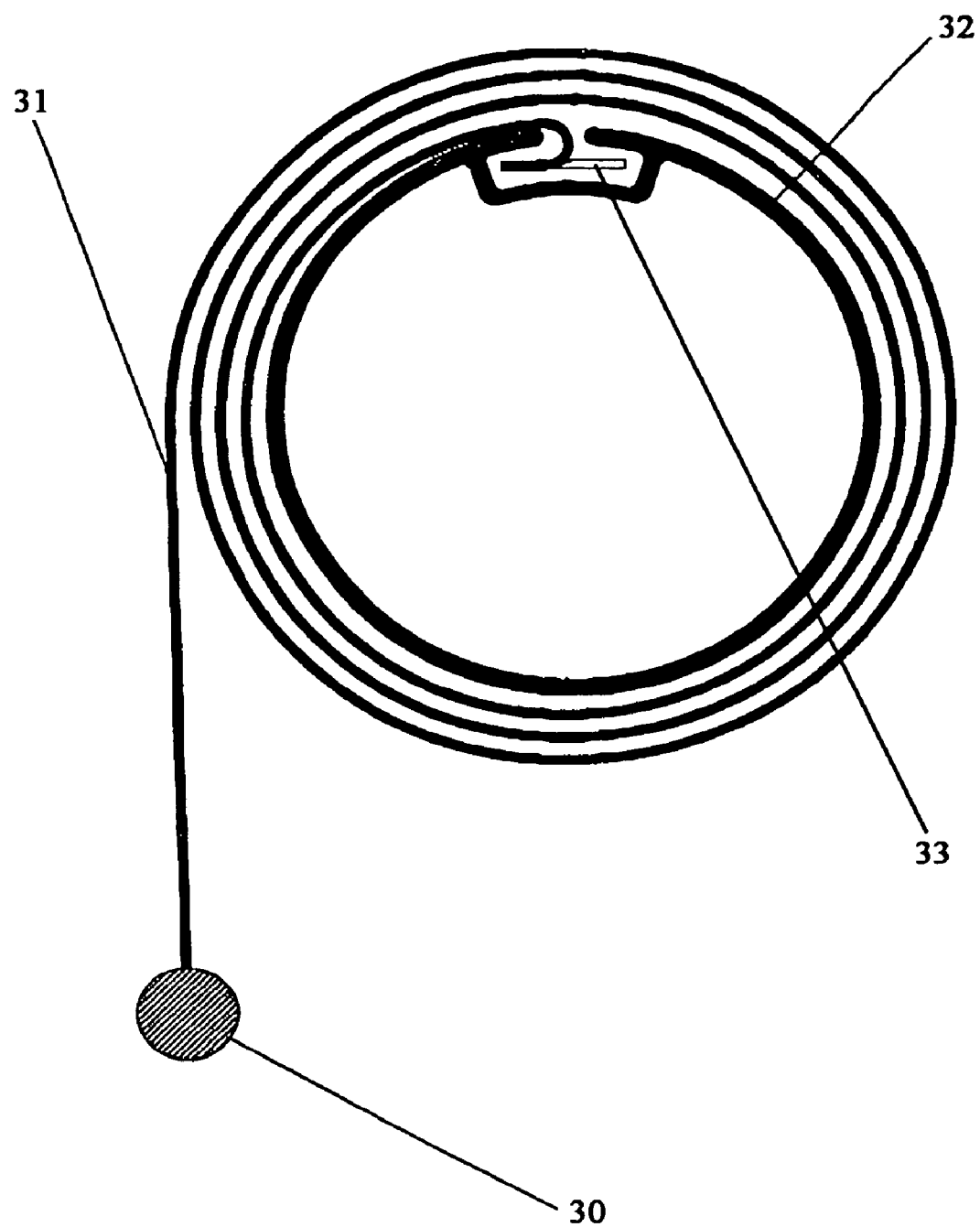
FIG. 1 is an end schematic view of the whole structure of the projection screen according to the invention.

In the figures,
1: transmission case head
2, 16: seal ring
3: pressing sleeve
4: self-locking spring spindle
5: transmission case
6: planetary gear fixing carrier
7: planetary gear
8, 9: planetary gear check ring
10: sun-gear planetary carrier
11: centrifugal brake shoe
12: driving rubber pulley
13: ratchet
14: shaft
15,21: screw
17: check ring
18: self-locking spring
19: brake shoe carrier
20: sealing member
22: internal surface
23: fluid inflow port
24: centrifugal shaft
25: internal teeth
26: boss
27: arcuate groove
30: pulling tube 30
31: curtain
32: rotating tube
33: decelerating and locking mechanism

DETAILED DESCRIPTION OF THE INVENTION

As illustrated in FIG. 1, the projection screen according to the invention comprises a pulling tube 30, a curtain 31, a decelerating and locking mechanism 33, a torsion spring assembly (not shown), a rotating tube 32 and a housing for the curtain (not shown), wherein one end of the curtain 31 is connected to the pulling tube 30 and the other end of the curtain 31 is connected to the rotating tube 32. When no longer in use, the curtain 31 rolls back around the rotating tube 32 by rotating the rotating tube 32. The decelerating and locking mechanism 33 is arranged in the rotating tube 32 and includes a decelerating mechanism and a locking mechanism.

Figure 2:
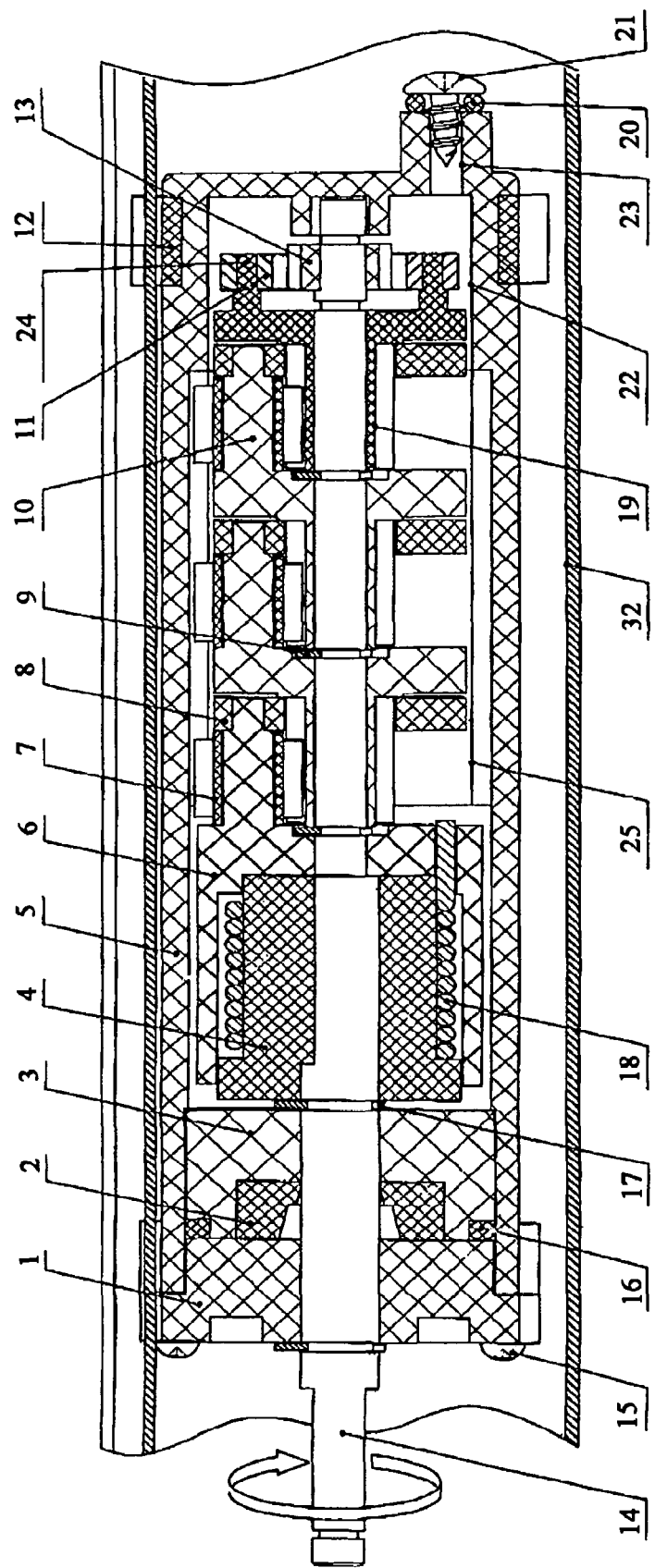
FIG. 2 is a schematic view of the decelerating and locking mechanism according to the invention.

As illustrated in FIG. 2, the decelerating and locking mechanism 33 is arranged in the rotating tube 32. The driving rubber pulley 12 is arranged in the rotating tube 32 and rotates the transmission case 5. The decelerating and locking mechanism 33 is mounted in the rotating tube 32 through a shaft 14. A decelerating mechanism and a locking mechanism are arranged in the transmission case 5. The decelerating mechanism performs the decelerating function (speed-reducing function) by means of a planetary gear system. The locking mechanism performs the locking function by means of a ratchet 13. A transmission case head 1 covers the transmission case 5 and is fixed by a screw 15. The pressing sleeve 3 is mounted on the shaft 14 to seal the transmission case head 1 by the seal rings 2 and 16. A self-locking spring spindle 4 is mounted on the shaft 14. A check ring 17 is arranged between the self-locking spring spindle 4 and the pressing sleeve 3. A self-locking spring 18 surrounds the self-locking spring spindle 4. The planetary gear fixing carrier 6 is mounted outside the self-locking spring 18. One end of the self-locking spring 18 is connected to the planetary gear fixing carrier 6 through an arcuate groove 27 formed in the planetary gear fixing carrier 6.

To increase the times of locking the rotating tube 32 and to lock the curtain 31 within a very small moving range, the decelerating mechanism can include three or more sets of planetary gear 7. The planetary gear 7 is mounted on the sun-gear planetary carrier 10 and the planetary gear fixing carrier 6, and its axial movement along the shaft 14 is limited by planetary gear check rings 8 and 9. The planetary gear 7 engages with the internal teeth 25 of the transmission case 5. The rotation of the rotating tube 32 is transferred to the braking mechanism through the variable transmission of the planetary gear sets. In this embodiment, the transmission ratio of the planetary gear 7 is 1:64, i.e. the centrifugal brake shoe 11 arranged on the brake shoe carrier 19 rotates 64 cycles during one cycle of the rotating tube 32. When the drive mechanism has 3 sets of planetary gear, the first set of planetary gear on the first planetary gear fixing carrier engages with the internal teeth of the transmission case 5 and cooperates with the second planetary gear fixing carrier; the second set of planetary gear on the second planetary gear fixing carrier cooperates with the third planetary gear fixing carrier; and the third set of planetary gear on the third planetary gear fixing carrier cooperates with the planetary braking and fixing carrier (i.e. the brake shoe carrier).

The decelerating and braking portion of the decelerating and locking mechanism 33 includes a sun-gear braking and fixing carrier (or the brake shoe carrier) 19 and centrifugal brake shoes 11. The sun-gear braking and fixing carrier 19 cooperates with the planetary gear 7. Specifically, the planetary gear 7 drives the sun-gear braking and fixing carrier 19 to rotate. The centrifugal shafts 24 are symmetrically arranged on the sun-gear braking and fixing carrier 19. The centrifugal brake shoes 11 are mounted on the centrifugal shafts 24 respectively. The internal surface 22 of the transmission case 5 serves as a brake drum to cooperate with the centrifugal brake shoe for performing the frictional decelerating function. The shaft 14 serves as a fixing shaft on which the self-locking spring spindle 4 and the ratchet 13 are mounted.

Figure 3:
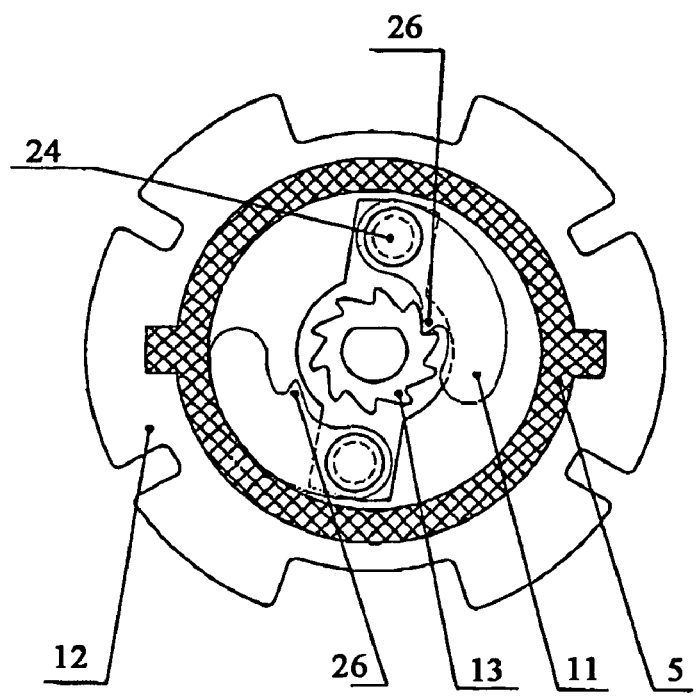
FIG. 3 is a schematic view of the locking mechanism in the locking state according to the invention.

As illustrated in FIG. 3, the locking mechanism is a ratchet locking device. The ratchet 13 is mounted on the shaft 14 as a locking device. The centrifugal shafts 24 are symmetrically arranged on the sun-gear braking and fixing carrier 19. The centrifugal brake shoes 11 are mounted on the centrifugal shafts 24 respectively. A boss 26 is arranged on the internal surface of each centrifugal brake shoe 11. The ratchet 13 cooperates with the bosses 26 on the internal surface of the centrifugal brake shoes 11 to perform the locking function. The decelerating mechanism includes three sets of planetary gear 7 with a transmission ratio of 1:64, i.e. the centrifugal brake shoes 11 rotate 64 cycles when the rotating tube 32 rotates one cycle. The stop ratchet 13 has 10 teeth. Two centrifugal brake shoes 11 are symmetrically arranged relative to the axis of the rotating tube 32. The distance between two locking positions is reduced with the number of the teeth of the ratchet 13 increasing. In this embodiment, the number of the teeth of the ratchet 13 is 10, which is enough for realizing an approximate stepless positioning of curtain 31, i.e. the curtain 31 can be locked in any position. When the curtain 31 has been rolled back completely, the rotating offset of the rotating tube 32 is relatively small because the ratchet 13 of the locking mechanism has a relatively small teeth pitch. Therefore the crease will not be formed on the curtain 31 in the locked state, and the force of the torsion spring applying on the curtain 31 is small.

Operation of the projection screen is explained as follows.

When pulling the curtain 31 by hand, the planetary gear fixing carrier 6 rotates clockwise as shown by the arrow in FIG. 2. By properly selecting the spring parameters of the self-locking spring 18, it is possible to make the lock force of the self-locking spring 18 less than the unlock force applied by the hand, so that the self-locking spring 18 spreads out and does not perform the self-locking function when the curtain 31 is pulling down. During the pulling down of the curtain 31, the self-locking spring 18 no longer locks the self-locking spring spindle 4, but rotates around the self-locking spring spindle 4. At this time, the planetary gear system which is connected with the self-locking spring 18 stops accelerating, and the centrifugal brake shoes 11 do not perform the braking function, therefore the curtain 31 can be pulled down easily.

When the curtain 31 is to be rolled back, the curtain 31 is firstly pulled down by hand to move downwardly a distance. At this time, the centrifugal brake shoes 11 spread out and the stop bosses 26 thereon are disengaged from the teeth of the ratchet 13. Subsequently, the hand is taken off to withdraw the external force. The rotating tube 31 rotates counterclockwise under the action of the torsion spring, and rotates the driving rubber pulley 12, the transmission case head 1 and the transmission case 5. The self-locking spring 18 locks the self-locking spring spindle 4, and the internal teeth of the transmission case 5 drive the planetary gear system including a planetary gear 7, a sun-gear planetary carrier 10, a brake shoe carrier 19 to accelerate, so that the centrifugal brake shoes 11 spread out under the action of the centrifugal force, and perform the braking function by the frictional interaction with the brake drum in the transmission case 5, thereby slowing down the rolling back speed of the curtain 31. In any position, the torsion force outputted by the torsion spring, after minus the weight of the curtain 31, can effectively drive the planetary gear system. The planetary gear system is moved by the effective torsion force. The centrifugal brake shoe 11 automatically adjusts the frictional force according to the speed, so that the rotating tube 32 rotates at an approximately uniform speed. Therefore, the curtain 31 can be rolled back at an approximately uniform speed by properly selecting spring parameters.

The locking or positioning process of the curtain 31 is as follows. When the curtain 31 is stopped at an appropriate position by hand, the rotating tube 32, the driving rubber pulley 12, the transmission case head 1, the transmission case 5, the planetary gear fixing carrier 6 and the planetary gear system stop rotating. The centrifugal brake shoes 11 are rotated by their own weight, and finally the stop bosses 26 of the centrifugal brake shoes 11 engage with the teeth of the ratchet 13. At the same time, the self-locking spring 18 locks the self-locking spring spindle 4, so that the curtain 31 is locked in position. The centrifugal brake shoes 11 can both perform the decelerating function by the frictional interaction with the brake drum during the rolling back of the curtain 31, and perform the locking function along with the self-locking spring 18 by engaging with the teeth of the ratchet 13 when the curtain 31 is to be locked.

When the curtain 31 has been rolled back, the stop bosses 26 of the centrifugal brake shoe are seized into the teeth of the ratchet, and the torsion force of the torsion spring acts only on the ratchet 13 rather than on the curtain 31. Therefore, the curtain 31 will not be continuously under tension and no crease will be formed thereon.

Figure 4:
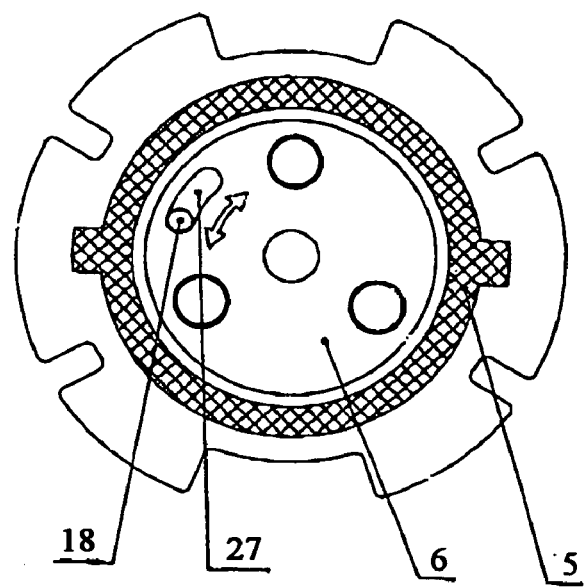
FIG. 4 is a schematic view of the structure of the arcuate groove in the planetary gear fixing carrier according to the invention.

As illustrated in FIG. 4, to prevent the curtain 31 in the completely unrolled state from being unable to be rolled back due to being stuck (that is, to easily roll back the curtain 31 after the curtain 31 has been completely unrolled), an arcuate groove 27 is provided in the planetary gear fixing carrier 6. One end of the self-locking spring 18 is connected with the arcuate groove 27 formed in the planetary gear fixing carrier 6. The arcuate groove 27 provides a space for the end of the self-locking spring 18 to move therein. The space assures that the curtain 31 can be rolled back after being locked.

To avoid an overheat produced by the friction between the centrifugal brake shoes 11 and the brake drum on the internal surface of the transmission case 5, a fluid inflow port 23 is arranged on the transmission case 5. A fluid for cooling the transmission members in the transmission case 5 is filled into the transmission case 5 through the fluid inflow port 23 so as to avoid the overheat produced by the friction. The fluid inflow port 23 can be sealed by a sealing member 20 and a screw 21.

According to the invention, the decelerating and locking mechanism and the projection screen using the same is compact and easy to assemble. Since the rolling back speed of the curtain is sufficiently damped and the force of the torsion spring acting on the curtain is decreased when the curtain has been rolled back completely, the curtain can be freely positioned or locked at any moment and is free of crease.

What is claimed:

1. A manually operated projection screen, comprising a pulling tube, a curtain, a decelerating and locking mechanism, a torsion spring assembly, a rotating tube and a housing, wherein the pulling tube is connected to one end of the curtain and the rotating tube is connected to the other end of the curtain, wherein the decelerating and locking mechanism is arranged in the rotating tube and includes a braking and locking device having a centrifugal brake shoe, a brake drum interacting with the centrifugal brake shoe to perform decelerating function, and a ratchet interacting with the centrifugal brake shoe to perform locking function.

2. A manually operated projection screen, comprising a pulling tube, a curtain, a decelerating and locking mechanism, a torsion spring assembly, a rotating tube and a housing, wherein the pulling tube is connected to one end of the curtain, the rotating tube is connected to the other end of the curtain, and the decelerating and locking mechanism is arranged in the rotating tube and includes a transmission case, a transmission case head, a shaft, a seal ring, a self-locking spring spindle, a self-locking spring, a planetary gear, a planetary gear fixing carrier, a centrifugal brake shoe and a ratchet; wherein the transmission case head covers the transmission case; the seal ring is pressed and mounted on the shaft; the self-locking spring spindle is mounted on the shaft; the self-locking spring surrounds the self-locking spring spindle;

the planetary gear fixing carrier is mounted outside the self-locking spring; one end of the self-locking spring is fixed to the planetary gear fixing carrier; the planetary gear is mounted on the planetary gear fixing carrier and engages with the internal teeth of the transmission case; the centrifugal brake shoe is arranged on a brake shoe carrier; the planetary gear drives the brake shoe carrier to rotate; the ratchet is arranged on the shaft, wherein the centrifugal brake shoe interacts with a brake drum to perform the decelerating function, and interacts with the ratchet to perform the locking function.

3. The manually operated projection screen according to claim 2, wherein at least one stop boss is formed on the surface of the centrifugal brake shoe to engage with the ratchet for the locking function; the inner surface of the transmission case serves as the brake drum to cooperate with the brake shoe for the decelerating function.

4. The manually operated projection screen according to claim 3, wherein the transmission ratio of the planetary gear is 1:32 or above.

5. The manually operated projection screen according to claim 4, wherein the transmission ratio of the planetary gear is 1:64.

6. The manually operated projection screen according to claim 3, wherein the ratchet has at least 6 teeth.

7. The manually operated projection screen according to claim 3, wherein the number of the centrifugal brake shoe is at least 2, centrifugal shafts are symmetrically formed on the brake shoe carrier, and the centrifugal brake shoes are arranged on the centrifugal shafts, respectively.

8. The manually operated projection screen according to claim 3, wherein an arcuate groove is provided in the planetary gear fixing carrier and one end of the self-locking spring is connected to the planetary gear fixing carrier by the arcuate groove.

9. The manually operated projection screen according to claim 3, wherein at least two stop bosses are formed on the surface of the centrifugal brake shoe and spaced with each other; the ratchet is fixed on the shaft and is stationary relative to the stop bosses formed on the surface of the centrifugal brake shoe.

10. The manually operated projection screen according to claim 3, wherein a fluid inflow port is provided on the transmission case.

11. A manually operated projection screen, comprising a pulling tube, a curtain, a decelerating and locking mechanism, a torsion spring assembly, a rotating tube and a housing, wherein the pulling tube is connected to one end of the curtain, the rotating tube is connected to the other end of the curtain, and the decelerating and locking mechanism is arranged in the rotating tube and includes a transmission case, a transmission case head, a shaft, a seal ring, a self-locking spring spindle, a self-locking spring, a planetary gear, a planetary gear fixing carrier, a centrifugal brake shoe and a ratchet; wherein the transmission case head covers the transmission case; the seal ring is pressed and mounted on the shaft; the self-locking spring spindle is mounted on the shaft; the self-locking spring surrounds the self-locking spring spindle; the planetary gear fixing carrier is mounted outside the self-locking spring; one end of the self-locking spring is fixed to the planetary gear fixing carrier; the planetary gear is mounted on the planetary gear fixing carrier and engages with the internal teeth of the transmission case; the centrifugal brake shoe is arranged on a brake shoe carrier; the planetary gear drives the brake shoe carrier to rotate; the ratchet is arranged on the shaft, wherein there are at least three sets of planetary gear.

12. A decelerating and locking mechanism for a projection screen, characterized in that wherein the decelerating and locking mechanism is formed by integrating a decelerating mechanism and a locking mechanism as a whole, the decelerating and locking mechanism includes a braking and locking device having a centrifugal brake shoe, a brake drum interacting with the centrifugal brake shoe to perform decelerating function, and a ratchet interacting with the centrifugal brake shoe to perform locking function.

13. The decelerating and locking mechanism according to claim 12, wherein at least one stop boss is formed on the centrifugal brake shoe to engage with the ratchet.

14. The decelerating and locking mechanism according to claim 13, wherein the decelerating and locking mechanism includes at least three sets of planetary gear, the transmission ratio of the planetary gear is 1:32 or above.

15. The decelerating and locking mechanism in claim 12, wherein the number of the centrifugal brake shoe is at least 2, at least two centrifugal shafts are symmetrically formed on the brake shoe carrier, and the centrifugal brake shoes are arranged on the centrifugal shafts, respectively.

16. A decelerating and locking mechanism for a projection screen, comprising a transmission case, a transmission case head, a shaft, a seal ring, a self-locking spring spindle, a self-locking spring, a planetary gear, a planetary gear fixing carrier, a centrifugal brake shoe and a ratchet; wherein the transmission case head covers the transmission case; the seal ring is pressed and mounted on the shaft; the self-locking spring spindle is mounted on the shaft; the self-locking spring surrounds the self-locking spring spindle; the planetary gear fixing carrier is mounted outside the self-locking spring; one end of the self-locking spring is fixed to the planetary gear fixing carrier; the planetary gear is mounted on the planetary gear fixing carrier and engages with the internal teeth of the transmission case; the centrifugal brake shoe is arranged on a brake shoe carrier; the planetary gear drives the brake shoe carrier to rotate; the ratchet is arranged on the shaft, wherein the centrifugal brake shoe interacts with a brake drum to perform decelerating function, and interacts with the ratchet to perform locking function.

17. The decelerating and locking mechanism according to claim 16, wherein at least one stop boss is formed on the surface of the centrifugal brake shoe to engage with the ratchet for the locking function; the inner surface of the transmission case serves as the brake drum to cooperate with the brake shoe for the decelerating function.

18. The decelerating and locking mechanism according to claim 17, wherein there are at least three sets of planetary gear.

19. The decelerating and locking mechanism according to claim 18, wherein the transmission ratio of the planetary gear is 1:32 or above.

20. The decelerating and locking mechanism according to claim 19, wherein the transmission ratio of the planetary gear is 1:64.

21. The decelerating and locking mechanism according to claim 17, wherein the ratchet has at least 6 teeth.

22. The decelerating and locking mechanism according to claim 17, wherein an arcuate groove is provided in the planetary gear fixing carrier and one end of the self-locking spring is connected to the planetary gear fixing carrier by the arcuate groove.

23. The decelerating and locking mechanism according to claim 17, wherein at least two bosses are formed on the surface of the centrifugal brake shoe and spaced with each other; the ratchet is fixed on the shaft and is stationary relative to the stop bosses.

24. The decelerating and locking mechanism according to claim 17, wherein a fluid inflow port is provided on the transmission case.

* * * * *